(12) United States Patent
Suh (10) Patent No.: US 7,742,376 B2
(45) Date of Patent: Jun. 22, 2010

(54) RECORDING MEDIUM AND METHOD AND APPARATUS FOR CONTROLLING THE RECORDING USING SEQUENCE NUMBERS OF CONTROL INFORMATION UNITS

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1020 days.

(21) Appl. No.: 11/480,881

(22) Filed: Jul. 6, 2006

(65) Prior Publication Data

US 2007/0008851 A1    Jan. 11, 2007

(30) Foreign Application Priority Data

Jul. 6, 2005    (KR) .................... 10-2005-0060748

(51) Int. Cl.
G11B 20/12    (2006.01)
G11B 7/00    (2006.01)

(52) U.S. Cl. ................. 369/59.26; 369/47.47

(58) Field of Classification Search ..... 369/47.2–47.22, 369/47.31, 47.47–47.52, 47.54, 59.23–59.27, 369/94, 275.1–275.4

See application file for complete search history.

(56) References Cited

U.S. PATENT DOCUMENTS

2004/0223440 A1    11/2004    Park
2005/0036425 A1    2/2005    Suh et al.
2005/0122851 A1*    6/2005    Nijboer et al. ........... 369/275.3
2005/0213467 A1*    9/2005    Noda et al. .............. 369/275.1

FOREIGN PATENT DOCUMENTS

WO    WO-2005/004138 A1    1/2005

* cited by examiner

Primary Examiner—Wayne R Young
Assistant Examiner—Nathan A Danielsen
(74) Attorney, Agent, or Firm—Birch, Stewart, Kolasch & Birch, LLP

(57) ABSTRACT

A recording medium equipped with recording/reproducing control information, and a method and apparatus for controlling the recording medium using the control information are disclosed. The recording medium includes: a data area in which data is recorded; and a management area in which control information is recorded, wherein the management area includes a plurality of first control information units equipped with the control information and a plurality of second control information units, the second control information unit being formed by grouping at least one first control information units among the plurality of first control information units, and the control information includes information indicating the number of consecutive second control information units among the plurality of second control information units. Therefore, the recording medium can be effectively controlled.

14 Claims, 10 Drawing Sheets

| Byte position | | Content | Number of byte |
|---|---|---|---|
| | 0 | Disc information identifier="DI" | 2 |
| | ≈ | | ≈ |
| DI unit (=P byte) | a | Number of DI units in consecutive DI Block | 1 |
| | b | Number of DI Block in consecutive DI Block | 1 |
| | c | DI Unit sequence number in consecutive DI Block | 1 |
| | ≈ | | |
| | | Actual DI information | |

| Byte position | Content | Number of byte |
|---|---|---|
| 0 | Disc information identifier="DI" | 2 |
| a | Number of DI units in consecutive DI Block | 1 |
| b | Number of DI Block in consecutive DI Block | 1 |
| c | DI Unit sequence number in consecutive DI Block | 1 |
| | Actual DI information | |

DI unit (=P byte)

| Byte position | Content | Number of byte |
|---|---|---|
| 0 | Disc information identifier="DI" | 2 |
| a | Number of DI units in consecutive DI Block(=2) | 1 |
| b | Number of DI Block in consecutive DI Block(=1) | 1 |
| c | DI Unit sequence number in consecutive DI Block(=0 or 1) | 1 |
| | Actual DI information | |

DI unit (=P byte)

| Byte position | Content | Number of byte |
|---|---|---|
| 0 | Disc information identifier="DI" | 2 |
| a | Number of DI units in consecutive DI Block(=35) | 1 |
| b | Number of DI Block in consecutive DI Block(=2) | 1 |
| c | DI Unit sequence number in consecutive DI Block(=0~34) | 1 |
| | Actual DI information | |

DI unit (=P byte)

RECORDING MEDIUM AND METHOD AND APPARATUS FOR CONTROLLING THE RECORDING USING SEQUENCE NUMBERS OF CONTROL INFORMATION UNITS

This application claims the benefit of Korean Patent Application No. 10-2005-0060748, filed on Jul. 6, 2005, which is hereby incorporated by reference as if fully set forth herein.

BACKGROUND OF THE INVENTION

1. Field of the Invention

The present invention relates to a recording medium, and a method and apparatus for controlling a recording medium using control information capable of controlling the recording medium.

2. Discussion of the Related Art

Generally, there has been widely used an optical disc acting as a recording medium capable of recording a large amount of data therein. Particularly, there has been newly developed a high-density optical recording medium (e.g., a HD-DVD) capable of recording/storing high-quality video data and high-quality audio data for a long period of time, for example, a Blu-ray Disc (BD).

The BD based on the next-generation HD-DVD technique has been considered to be the next-generation optical recording solution capable of storing much more data than a conventional DVD. In recent times, the international standard technical specification associated with the BD has been established.

A variety of standard technical specifications associated with the BD have been established. And, a variety of standard technical specifications associated with various discs, for example, a 1×-speed BD-RE (Blu-ray Disc Rewritable), a high-speed (at least 2×-speed) BD-RE, a write-once BD-R, and a BD-ROM (Read Only Memory), have also been established.

In recent times, the above-mentioned BD-associated standard technical specifications are being extended from a conventional BD composed of one or two recording layers to a multi-layered BD composed of at least three recording layers and also being extended from a conventional BD being capable of one or two type of writing speed and/or write parameters (e.g., write strategy parameters) to a multi type BD being capable of a plurality of writing speed and/or write parameters.

However, detailed technical backgrounds associated with the multi-layered BD have not yet been completed, such that many limitations and problems occur in developing the optical recording/reproducing device.

SUMMARY OF THE INVENTION

Accordingly, the present invention is directed to a recording medium, and a method and apparatus for controlling the recording medium that substantially obviate one or more problems due to limitations and disadvantages of the related art.

An object of the present invention is to provide a recording medium equipped with control information acting as standardized information.

Another object of the present invention is to provide a method and apparatus for controlling a recording medium using control information contained in the recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium comprises: a data area in which data is recorded; and a management area in which control information is recorded, wherein the management area includes a plurality of first control information units equipped with the control information and a plurality of second control information units, the second control information unit being formed by grouping at least one first control information units among the plurality of first control information units, and the control information includes information indicating the number of consecutive second control information units among the plurality of second control information units.

In another aspect of the present invention, there is provided a recording medium comprising: a data area which is configured in the form of record tracks of a wobbled structure including modulated control information, and records data, wherein the control information is contained in a plurality of first control information units and a plurality of second control information units, the second control information unit being formed by grouping at least one first control information units among the plurality of first control information units, and includes information indicating the number of consecutive second control information units among the plurality of second control information units.

In yet another aspect of the present invention, there is provided a recording medium comprising: a plurality of recording layers; a data area for recording data in each recording layer; and a management area for recording control information in at least one of the recording layers, wherein the management area includes a plurality of first control information units equipped with the control information and a plurality of second control information units, the second control information unit being formed by grouping at least one first control information units among the plurality of first control information units, and the control information includes information indicating the number of consecutive second control information units among the plurality of second control information units.

In yet another aspect of the present invention, there is provided a method for controlling a recording medium comprising the steps of: a) reading control information from a plurality of first control information units including the control information, and recognizing information, which is indicative of the number of consecutive second control information units among a plurality of second control information units formed by grouping the plurality of first control information units, by referring to the read control information; and b) controlling the recording medium using the control information recorded in at least one first control information unit contained in the consecutive second control information units.

In yet another aspect of the present invention, there is provided an apparatus for controlling a recording medium comprising: a recording/reproducing unit for reading control information from a plurality of first control information units including the control information, and recognizing information, which is indicative of the number of consecutive second control information units among a plurality of second control information units, the second control information unit being formed by grouping at least one first control information units among the plurality of first control information units; and a controller for transmitting a control command to the recording/reproducing unit using the control information recorded in at least one first control information unit contained in the consecutive second control information unit.

In yet another aspect of the present invention, there is provided an apparatus for controlling a recording medium comprising: a pickup for recording and reproducing data on/from the recording medium, and a controller configured to control the pickup to read control information from a plurality of first control information units including the control information, and to recognize information, which is indicative of the number of consecutive second control information units among a plurality of second control information units, the second control information unit being formed by grouping at least one first control information units among the plurality of first control information units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method and apparatus for controlling the recording medium will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Control Information" is indicative of a variety of information used for recording/reproducing operations of a recording medium. For example, record-associated parameters (e.g., write-strategy information, and writing speed information), and data transfer rate information may correspond to the above-mentioned control information.

Specifically, the control information according to the present invention includes not only information indicating the number of control information units capable of recording control information therein, but also continuity information.

The term "control information unit" is indicative of a minimum unit capable of recording the above-mentioned control information. The above-mentioned control information unit includes a plurality of first control information units for recording actual control information therein and a plurality of second control information units formed by the first control information units grouped by a predetermined number.

Specifically, the BD according to the present invention includes the first and second control information units. In this case, the first control information unit is called a DI (Disc Information) unit, and the second control information unit is called a DI (Disc Information) block, and their detailed descriptions will be described later with reference to FIG. 3.

It should be noted that other recording mediums other than the BD may use other terms instead of the DI unit and the DI block, and the above-mentioned terms may also be included in the technical scope of the present invention.

Figure 1A:
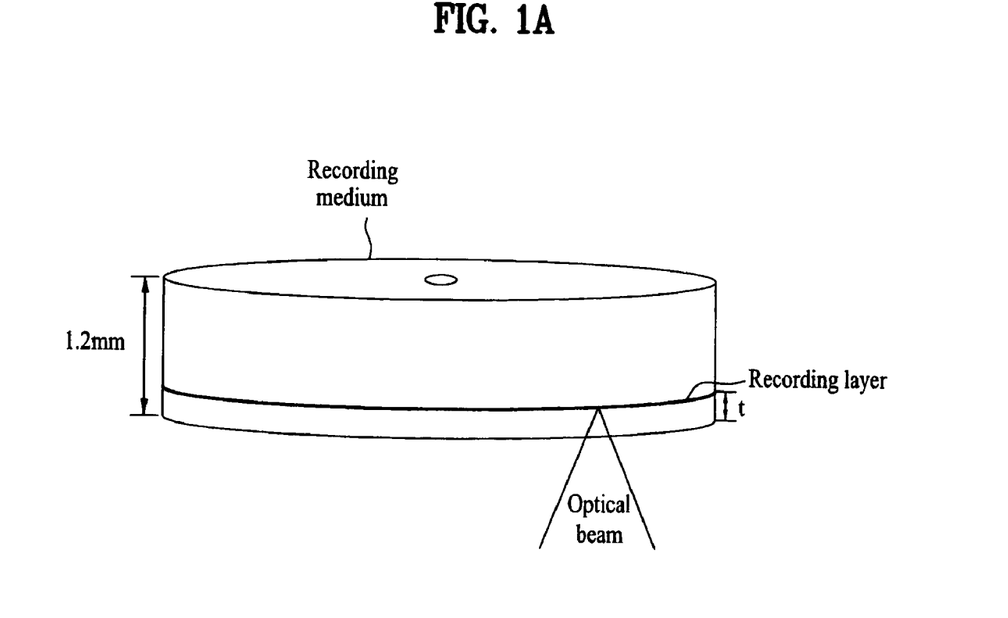
FIGS. 1A 1B are structural diagrams illustrating a recording medium composed of one or more recording layers according to the present invention.
Figure 1B:
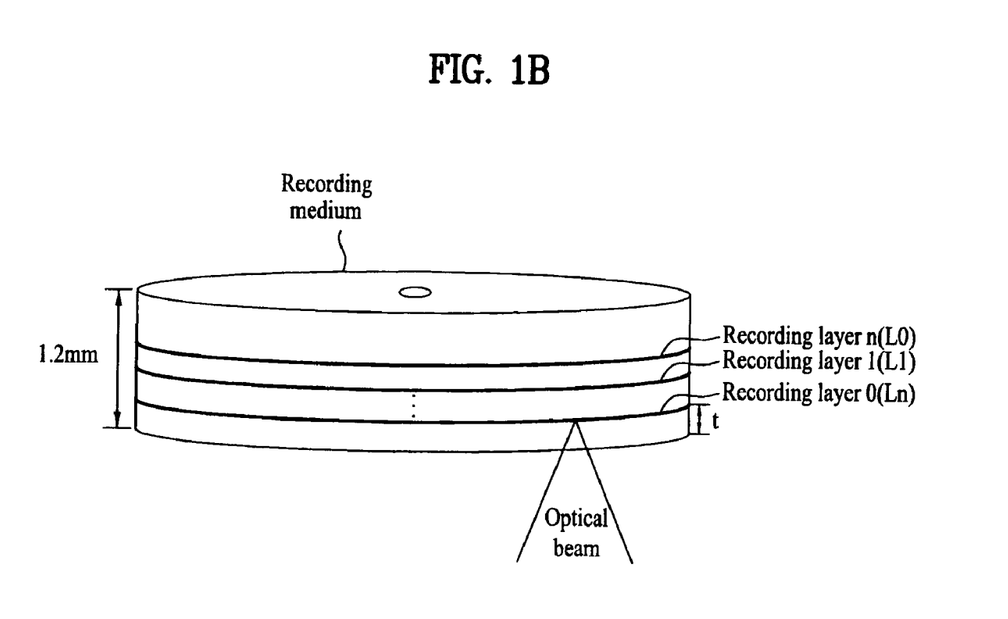

FIG. 1A is a structural diagram illustrating a recording medium composed of a single recording layer according to the present invention. FIG. 1B is a structural diagram illustrating a recording medium composed of several recording layers according to the present invention. As previously stated above, an optical disc will be used as the recording medium for the convenience of description.

The optical disc includes at least one recording layer within a predetermined thickness (e.g., 1.2 mm).

FIG. 1A shows an optical disc composed of a single recording layer. FIG. 1B shows an optical disc composed of several recording layers. In association with the above-mentioned description, the BD may include a maximum of 8 recording layers.

For the convenience of description and better understanding of the present invention, the outermost recording layer on the basis of an optical beam is referred to as a first recording layer (L0), and the innermost recording layer on the basis of the optical beam (i.e., the closest recording layer to the optical beam) is referred to as an N-th recording layer (Ln).

Figure 2:
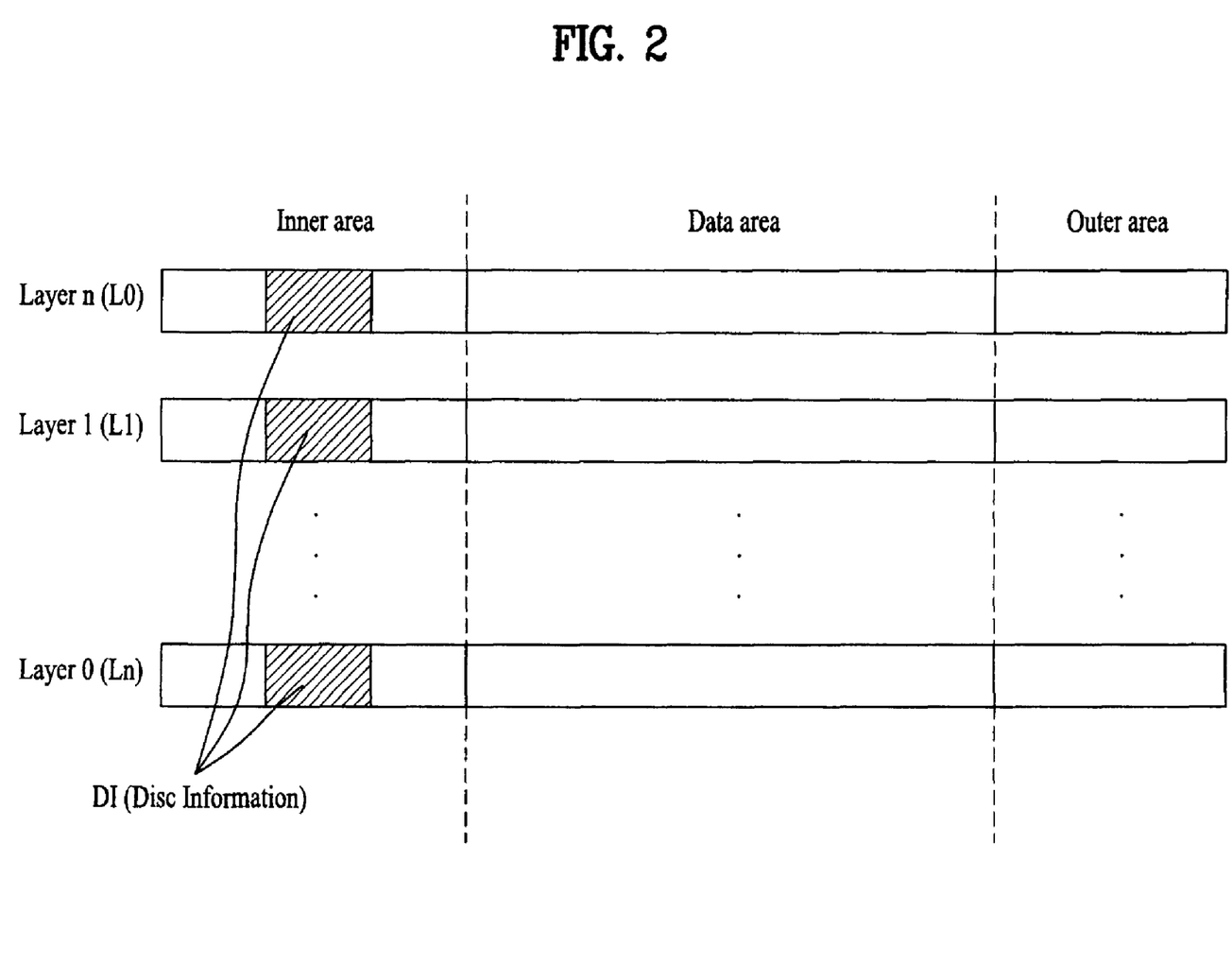
FIG. 2 exemplarily shows a physical structure for each recording layer of a recording medium according to the present invention.

FIG. 2 exemplarily shows a physical structure for each recording layer of a recording medium according to the present invention. For example, FIG. 2 shows a physical structure of an optical disc composed of several N recording layers.

In other words, each recording layer includes a data area and a management area. The management area includes an inner area and an outer area. The inner area and the outer area are adjacent to each other.

In association with the above-mentioned description, the management area includes a specific area for recording control information according to the present invention. For example, the physical structure of FIG. 2 includes DI acting as the above-mentioned control information in the inner area.

The above-mentioned control information may also be included in the recording medium according to another scheme, instead of the above-mentioned scheme. For example, a wobbled structure of a recording track is modulated, such that the above-mentioned control information may be configured with a wobble address.

In more detail, a specific recording medium (e.g., a BD) pre-records the above-mentioned control information in the inner area. In this case, the pre-recorded control information is recorded in the form of embossed pits. Also, the wobbled shape of the recording track is modulated, such that control information may also be contained in the wobbled structure.

Therefore, an optical recording/reproducing device directly reads the pre-recorded control information from the inner area of the recording medium, and demodulates the wobbled structure of the recording track, such that it reads the control information.

For example, the same information is repeatedly recorded in the pre-recorded control information or the wobbled structure's control information. The reason for the repeatedly recording of the same information is to prevent control information acting as important information for recording/reproducing data from being damaged by a scratch or contamination of a recording medium.

As can be seen from FIG. 2, DI acting as control information is contained in all the inner areas for each recording layer. For another example, the DI may be selectively contained in only the inner area of a specific recording layer, or may also be contained in the outer area instead of the inner area.

Figure 3:
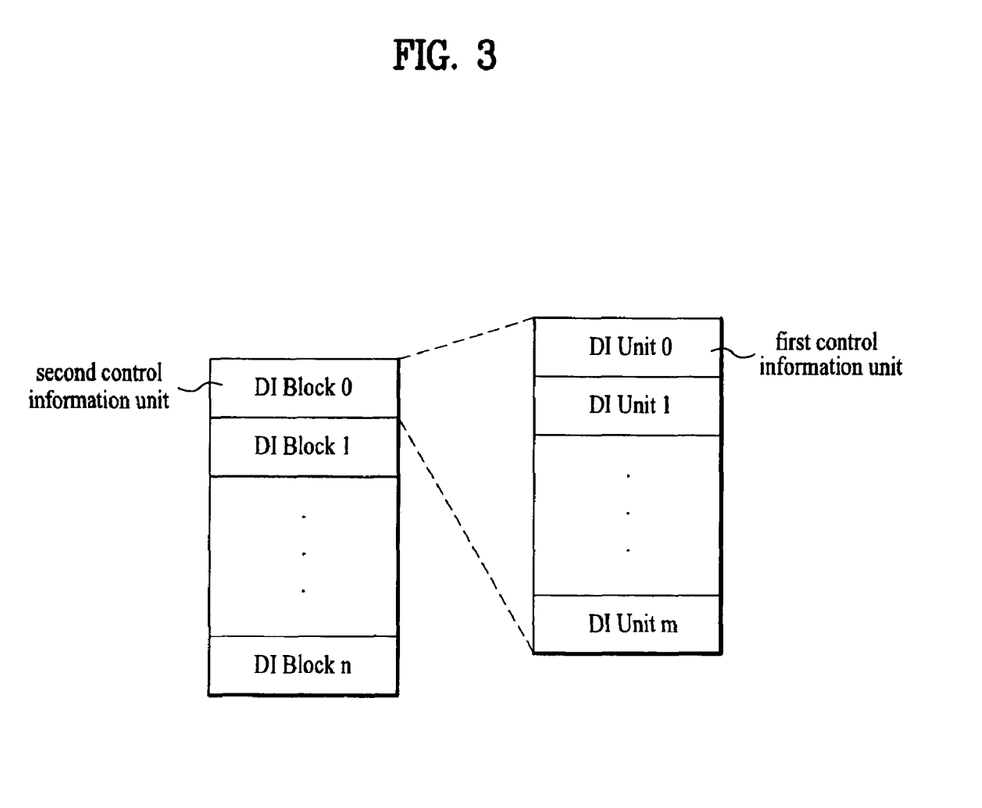
FIG. 3 shows a first control information unit and a second control information unit, each of which records control information of a recording medium therein, according to the present invention.

FIG. 3 shows a first control information unit and a second control information unit, each of which records control information of a recording medium therein, according to the present invention. As previously stated above, the first control information unit is referred to as the DI unit, and the second control information unit is referred to as the DI block.

A single DI block is formed by the grouping of several DI units (DI Unit 0 DI Unit m), and the DI includes several DI blocks (DI Block 0 DI Block n).

For example, the DI includes 32 (n=31) DI blocks (DI Block 0 DI Block 31), and the single DI block includes 32 (m=31) DI units (DI Unit 0 DI Unit 31). However, it should be noted that the above-mentioned examples of the DI and the DI block are disclosed for only illustrative purposes, and can be applied to other examples as necessary.

Figure 4:
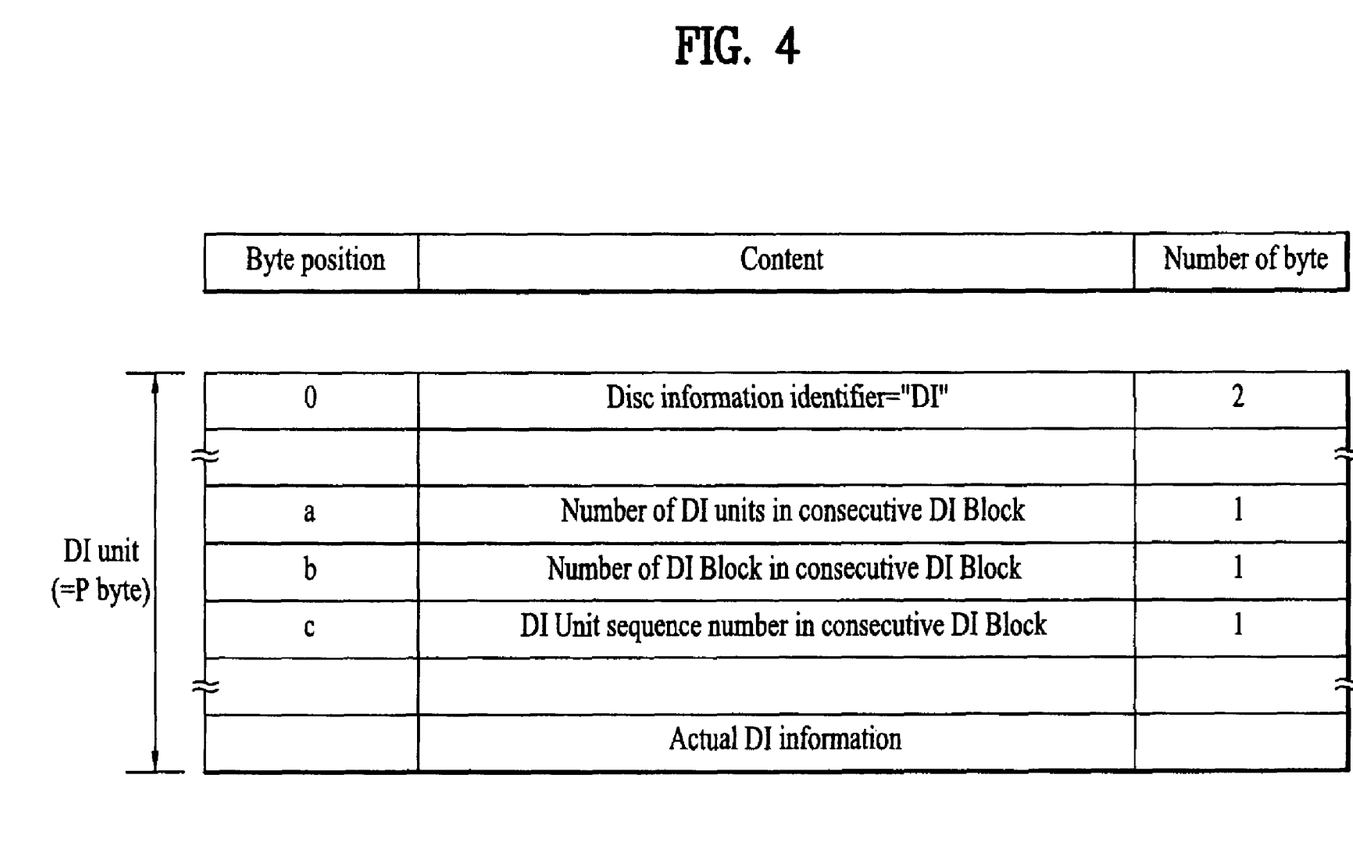
FIG. 4 shows a variety of types of control information contained in a first control information unit according to the present invention.

FIG. 4 shows a variety of types of control information contained in a first control information unit according to the present invention.

In other words, the DI unit according to the present invention may include a predetermined number of bytes (e.g., P bytes). For example, the DI unit of a BD-R or BD-RE may include 112 bytes (i.e., P=112), and the DI unit of a BD-ROM may include 64 bytes (i.e., P=64).

In association with the above-mentioned description, the DI unit of the BD-R or the BD-RE is greater than that of the BD-ROM because the BD-R or the BD/RE requires many more record-associated parameters (e.g., write strategy information) acting as control information than that of the BD-ROM.

The control information according to the present invention, i.e., information recorded in the DI unit acting as the first control information unit, will hereinafter be described with reference to the annexed drawings.

Referring to FIG. 4, Disc Information (DI) Identifier information capable of determining corresponding information to be DI is recorded in a header field of the DI unit. Control information for indicating the number of DI units acting as the first control information units, the number of DI blocks acting as the second control information units, and their consecutive characteristics are recorded in specific bytes, respectively (e.g., a, b, and c bytes).

A b-th byte of the DI unit includes a "Number of DI block in consecutive DI block" field, such that the "Number of DI block in consecutive DI block" field records information indicating the number of consecutive DI blocks. Also, an a-th byte of the DI unit includes a "Number of DI units in consecutive DI block" field, such that the "Number of DI units in consecutive DI block" field records information indicating the number of DI units acting as the first control information units contained in the consecutive DI block.

In association with the above-mentioned description, it is assumed that a total of 32 DI units are grouped in a single DI block. For example, if the number of DI units acting as the control information is set to a value from 1 to 32, a single DI block configures a single consecutive DI block.

In this case, the value of the "Number of DI block in consecutive DI block" field of the b-th byte may be set to "1", and the value of the "Number of DI units in consecutive DI block" field of the a-th byte may be set to a specific number from among the numbers of 1 32.

If the number of DI units acting as control information is determined to be one of 33 64, two DI blocks configure a single consecutive DI block. In this case, the value of the "Number of DI block in consecutive DI block" field of the b-th byte may be set to "2", and the value of the "number of DI units in consecutive DI block" field may be set to a specific number from among the numbers of 33 64.

If the number of DI units acting as control information is determined to be one of 65 96, three DI blocks configure a single consecutive DI block. In this case, the value of the "Number of DI block in consecutive DI block" field of the b-th byte may be set to "3", and the value of the "number of DI units in consecutive DI block" field may be set to a specific number from among the numbers of 65 96.

The reason why the number of DI units is different according to individual recording mediums is as follows. A plurality of recording layers may exist, and a recording speed is increased, such that record speeds and record-associated parameters of individual recording layers require different DI units.

Also, a c-th byte of the DI unit includes a "DI unit sequence number in consecutive DI block" field, such that the "DI unit sequence number in consecutive DI block" field includes sequence number information of DI units contained in the consecutive DI block.

For example, if the value of a "Number of DI units in consecutive DI block" field of the a-th byte is set to "35", this means that a total of 35 DI units exist in the consecutive DI block. A c-th byte of each DI unit records any one of 0 34 according to the sequence of a corresponding DI unit.

In more detail, the relationship between the DI unit acting as the first control information unit and the DI block acting as the second control information unit can be more clearly recognized by the above-mentioned a-, b-, and c-th bytes, such that control information contained in the recording medium can also be accurately recognized.

In association with the above-mentioned description, not only the above-mentioned a-, b-, and c-th bytes, but also a variety of control information (e.g., Actual DI information) for recording/reproducing data in/from the recording medium will be recorded in the above-mentioned DI unit.

Figure 5A:
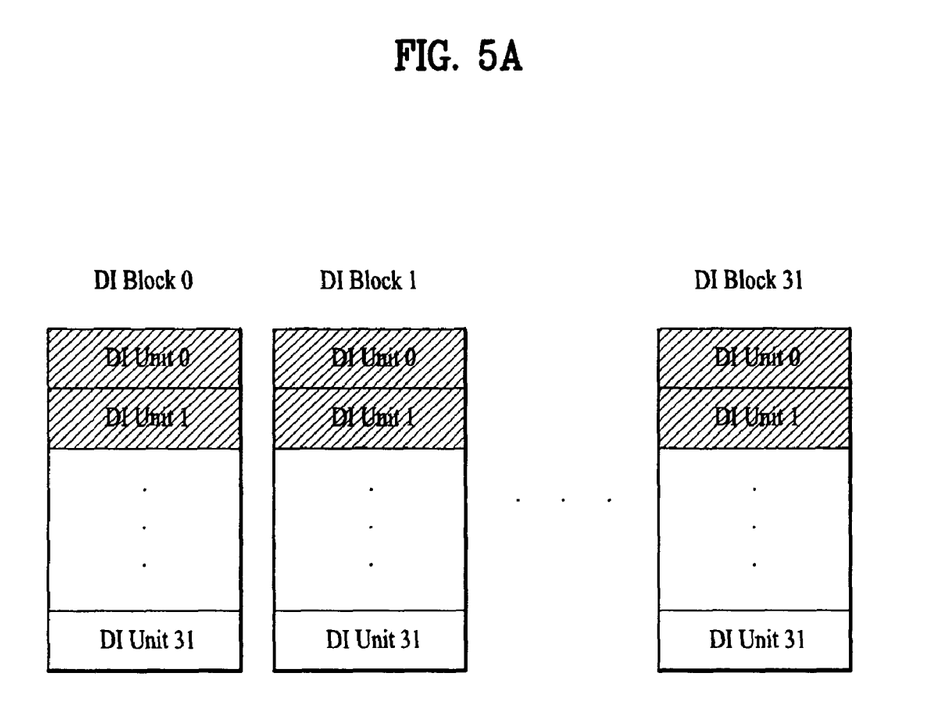
FIGS. 5A 5B are conceptual diagrams illustrating a method for recording control information according to a preferred embodiment of the present invention.
Figure 5B:
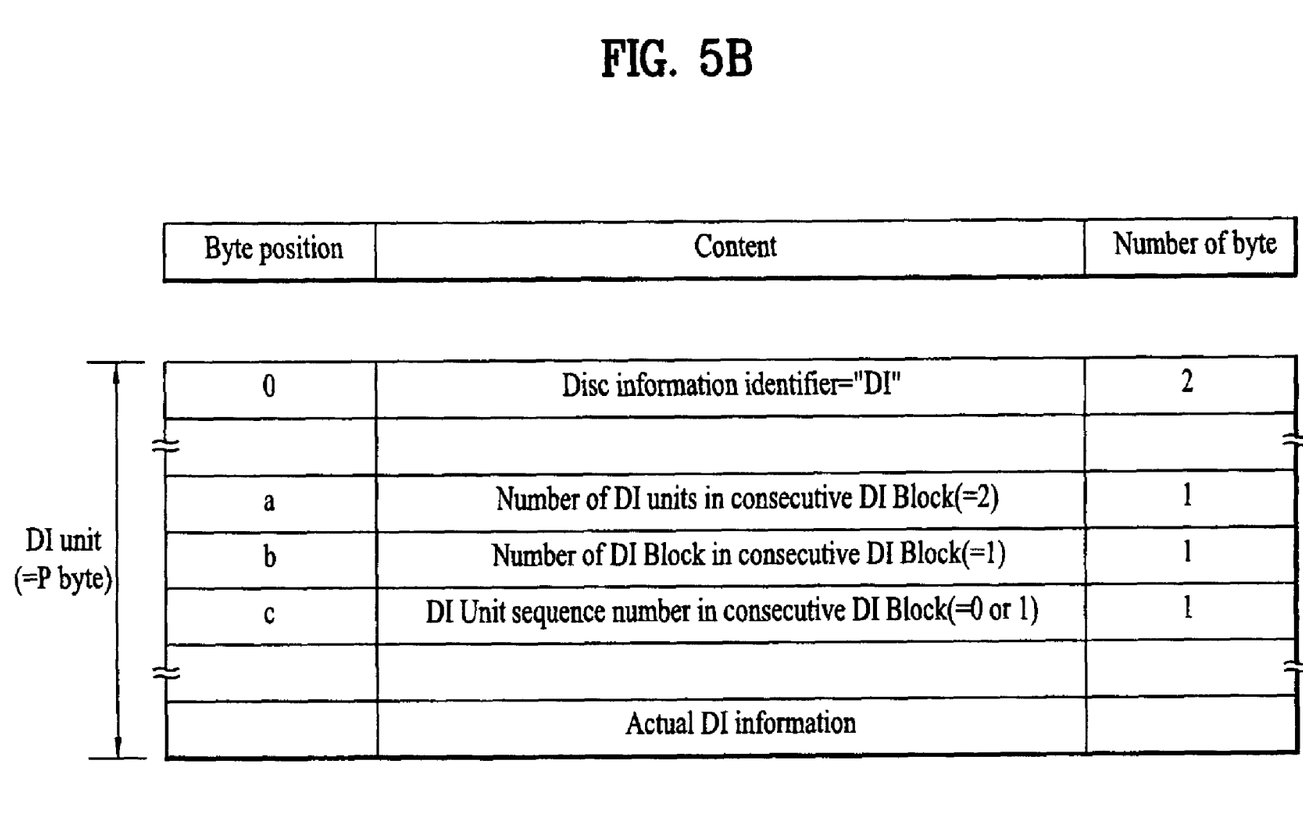

FIGS. 5A 5B are conceptual diagrams illustrating a method for recording control information according to a preferred embodiment of the present invention.

FIG. 5A shows an example in which two DI units are required. In more detail, a "consecutive DI block" field is composed of a single DI block, and records two DI units (i.e., DI Unit 0 and DI Unit 1) in a corresponding DI block (DI Block 0).

In this case, the remaining DI units (DI Unit 2 DI Unit 31) contained in a first DI block (DI Block 0) are set to "00h", and thereby indicate that there is no valid control information in the DI units (DI Unit 2 DI Unit 31). The remaining DI blocks (DI Block 1 DI Block 31) repeatedly record the same information as that of the first DI block (DI Block 0).

The values of the a-, b-, and c-th bytes for each DI unit shown in FIG. 5A will hereinafter be described with reference to FIG. 5B.

In other words, the value of the "Number of DI block in consecutive DI block" field of the b-th byte of all DI units (DI Unit 0 and DI Unit 1) recording the control information is set to "1", and the value of the "Number of DI units in consecutive DI block" field of the a-th byte is set to "2". Also, the value of the "DI unit sequence number in consecutive DI block" field of the c-th byte of the first DI unit (DI Unit 0) is set to "0", and the value of the "Di unit sequence number in consecutive DI block" field of the c-th byte is set to "1".

Figure 6A:
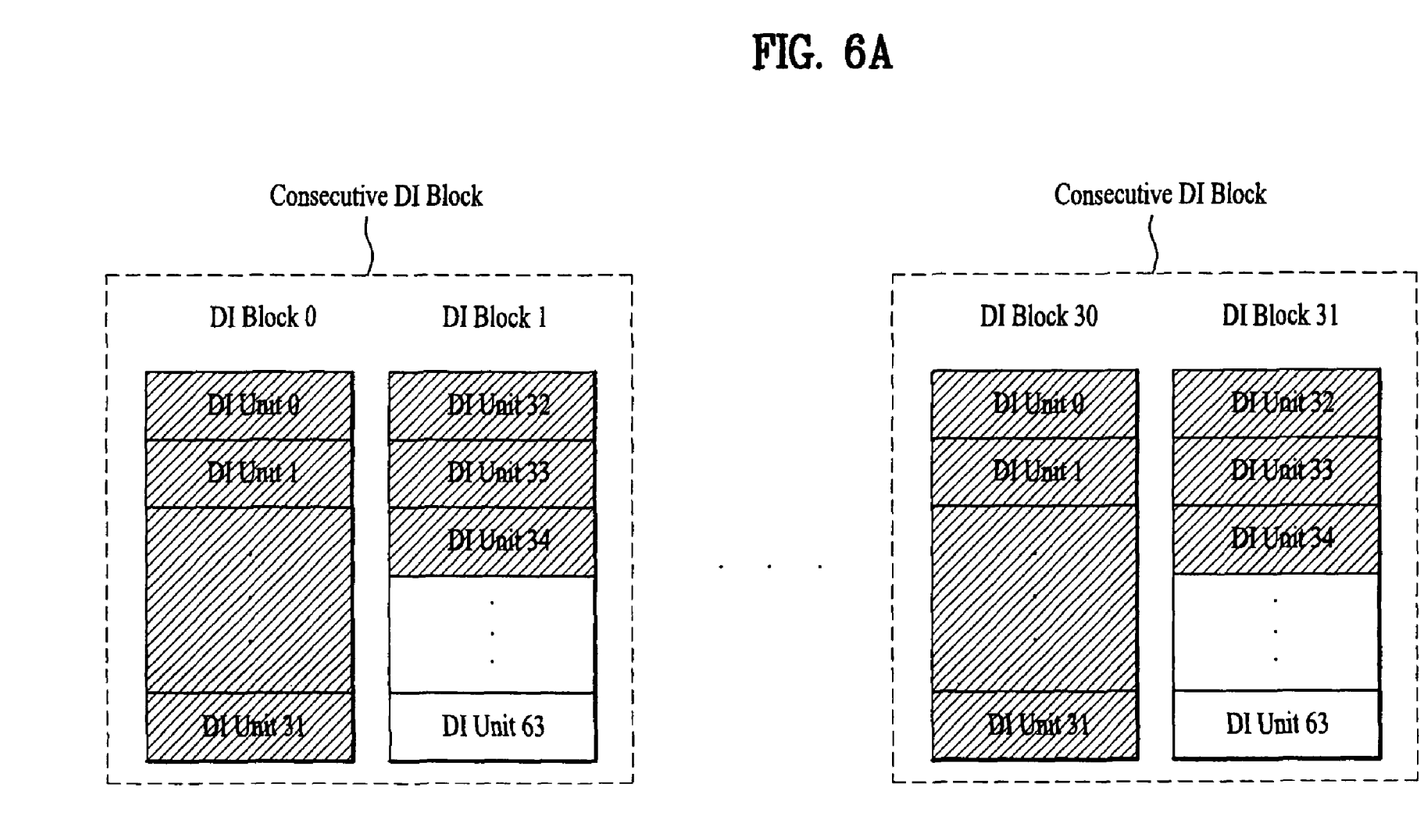
FIGS. 6A 6B are conceptual diagrams illustrating a method for recording control information according to another preferred embodiment of the present invention.
Figure 6B:
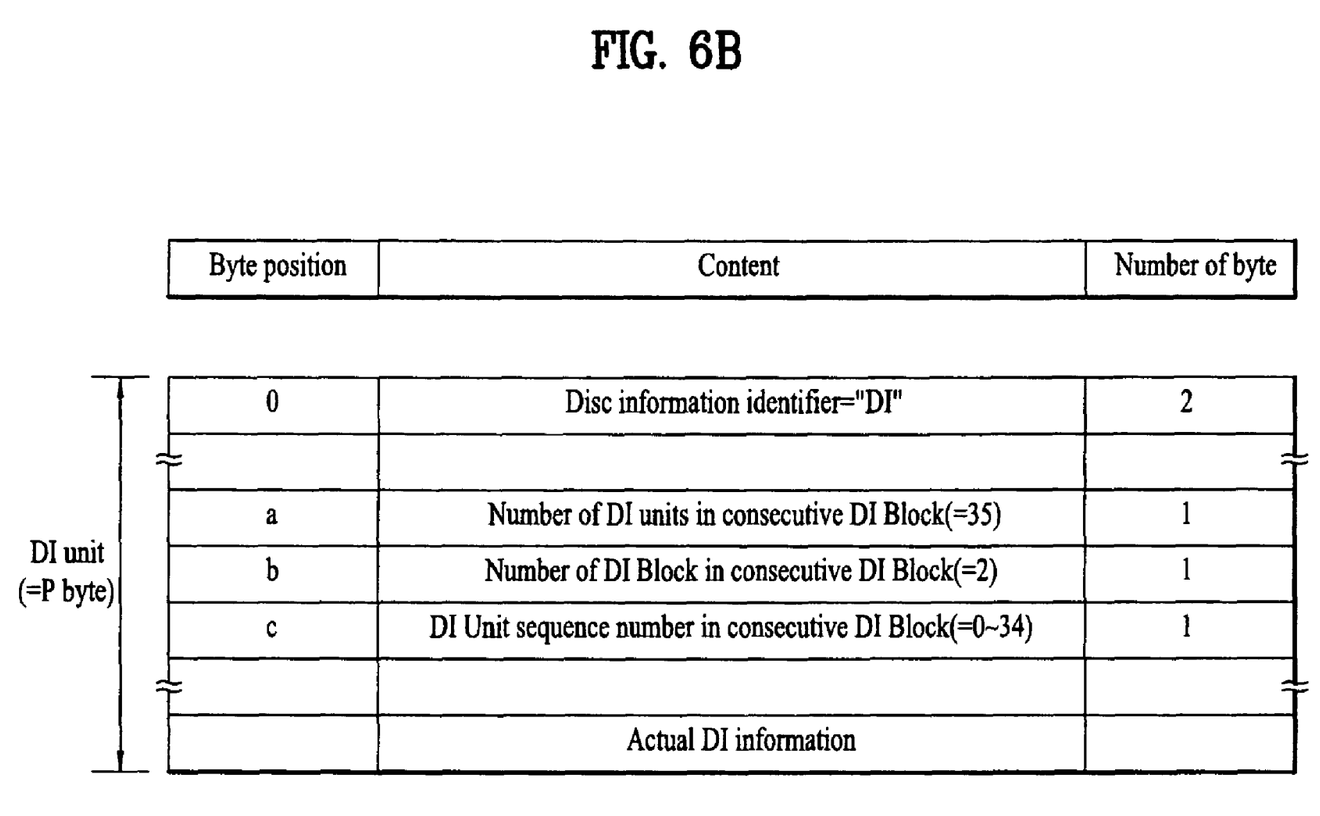

FIGS. 6A 6B are conceptual diagrams illustrating a method for recording control information according to another preferred embodiment of the present invention.

FIG. 6A shows an example in which 35 DI units are required. In more detail, a "consecutive DI block" field is composed of two DI blocks (DI Block 0 and DI Block 1), and records a total of 35 valid DI units (DI Unit 0 DI Unit 34) in corresponding DI blocks (DI Block 0 and DI Block 1).

In this case, valid control information is recorded in not only all DI units (DI Unit 2 DI Unit 31) contained in a first DI block (DI Block 0) but also three DI units (DI Unit 32 DI Unit 34) contained in a second DI block (DI Block 1). The remaining DI units (DI Unit 35 DI Unit 63) contained in a second DI block (DI Block 1) are set to "00h", and thereby indicate that there is no valid control information in the DI units (DI Unit 35 DI Unit 64).

Also, the remaining DI blocks (DI Block 2 DI Block 31) group two DI blocks adjacent to each other to form a single consecutive DI block, and repeatedly record data in the consecutive DI block in the same manner as in the above-mentioned method.

The values of the a-, b-, and c-th bytes for each DI unit shown in FIG. 6A will hereinafter be described with reference to FIG. 6B.

In other words, the value of the "Number of DI block in consecutive DI block" field of the b-th byte of all DI units (DI Unit 0 DI Unit 34) recording the control information is set to "2", and the value of the "Number of DI units in consecutive DI block" field of the a-th byte is set to "35". Also, the value of the "DI unit sequence number in consecutive DI block" field of the c-th byte of the DI units (DI Unit 0 DI Unit 34) may be set to any one from among the numbers of 0 34 according to the sequence number of a corresponding DI unit.

Figure 7:
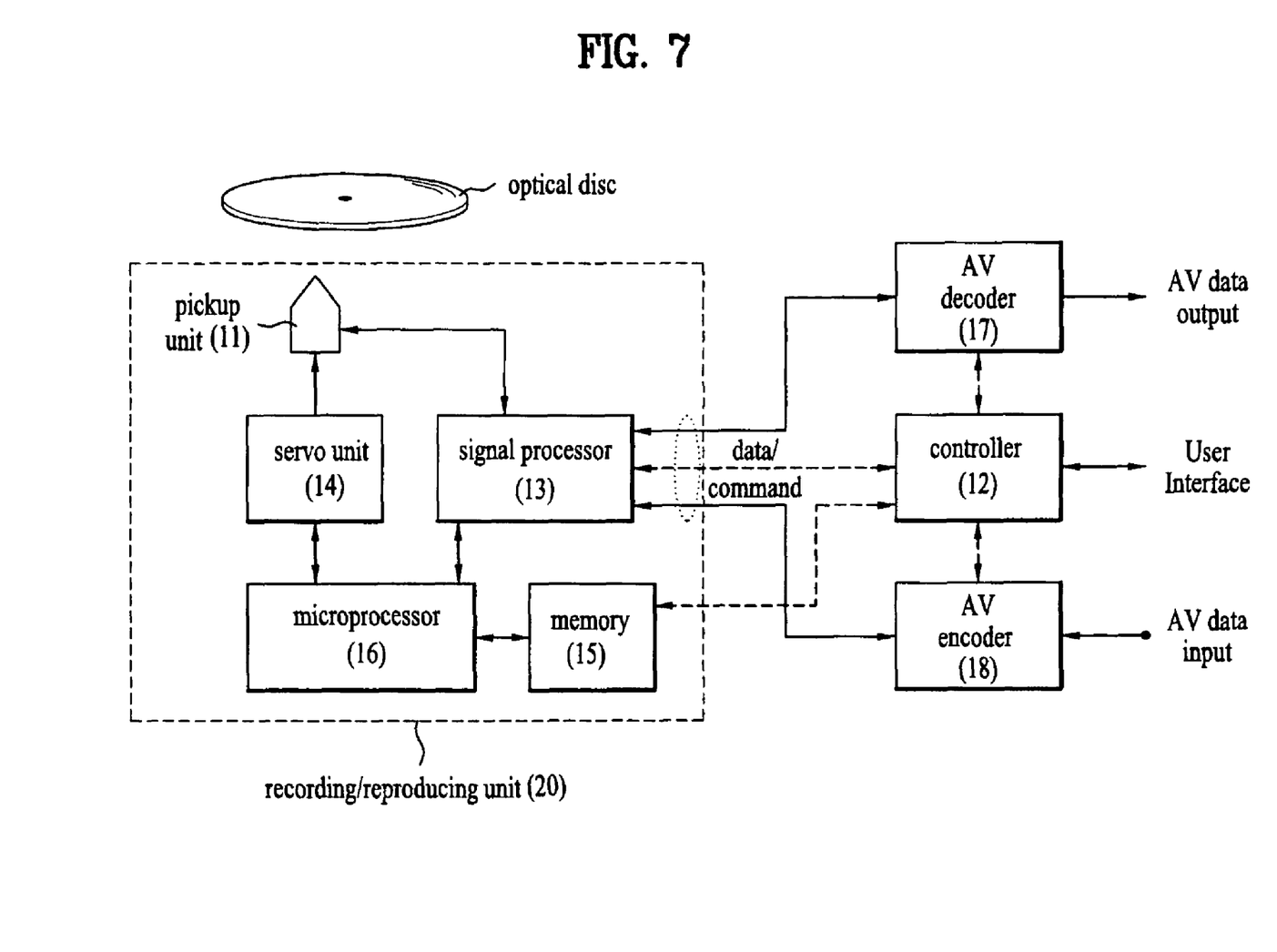
FIG. 7 is a block diagram illustrating an apparatus for controlling a recording medium according to the present invention.

FIG. 7 is a block diagram illustrating an apparatus for controlling a recording medium according to the present invention.

Referring to FIG. 7, the apparatus for controlling the recording medium according to the present invention includes a recording/reproducing unit 20 for recording/reproducing data in/from a disc, and a controller 12 for controlling the recording/reproducing unit 20.

The recording/reproducing unit 20 includes a pickup unit 11, a signal processor 13, a servo unit 14, a memory 15, and a microprocessor 16. The pickup unit 11 reads data and management information from the optical disc. The signal processor 13 receives a signal read from the pickup unit 11, restores the received signal to a desired signal value, or modulates a signal to be recorded into another signal recorded in the optical disc, such that it transmits the recovered or modulated result. The servo unit 14 controls operations of the pickup unit 11. The memory 15 temporarily stores not only management information but also data. The microprocessor 16 controls overall operations of the above-mentioned components.

Specifically, a manufactured product composed of only the above-mentioned recording/reproducing unit 20 may also be referred to as a drive.

The controller 12 controls operations of overall constituent components of the optical recording/reproducing device. In association with the present invention, the controller 12 refers to a user command by interfacing with a user, and transmits the user command to the microprocessor 16 contained in the recording/reproducing unit 20, such that it can perform the user-desired operation according to the user command. Specifically, the controller 12 refers to disc management information received from the recording/reproducing unit 20, generates a recording/reproducing command capable of recording/reproducing data in/from the optical disc, and re-transmits the recording/reproducing command to the recording/reproducing unit 20.

The functions of the controller 12 and the microprocessor 16 can be separated and operated by a first control unit and a second control unit, respectively. Alternatively, the functions of the controller 12 and the microprocessor 16 can be combined and operated as a single control unit.

The AV decoder 17 decodes a signal read from the optical disc upon receiving a control signal from the controller 12, restores the decoded signal to desired information, and transmits the restored signal to the user.

The AV encoder 18 receives a control signal from the controller 12 to record a desired signal in the optical disc, converts the received signal into a specific-format signal (e.g., an MPEG2 transport stream), and transmits the specific-format signal to the signal processor 13.

A method for controlling the recording medium (e.g., a method for controlling a record or playback function of data) using the above-mentioned control apparatus shown in FIG. 7 will hereinafter be described with reference to FIG. 8.

Figure 8:
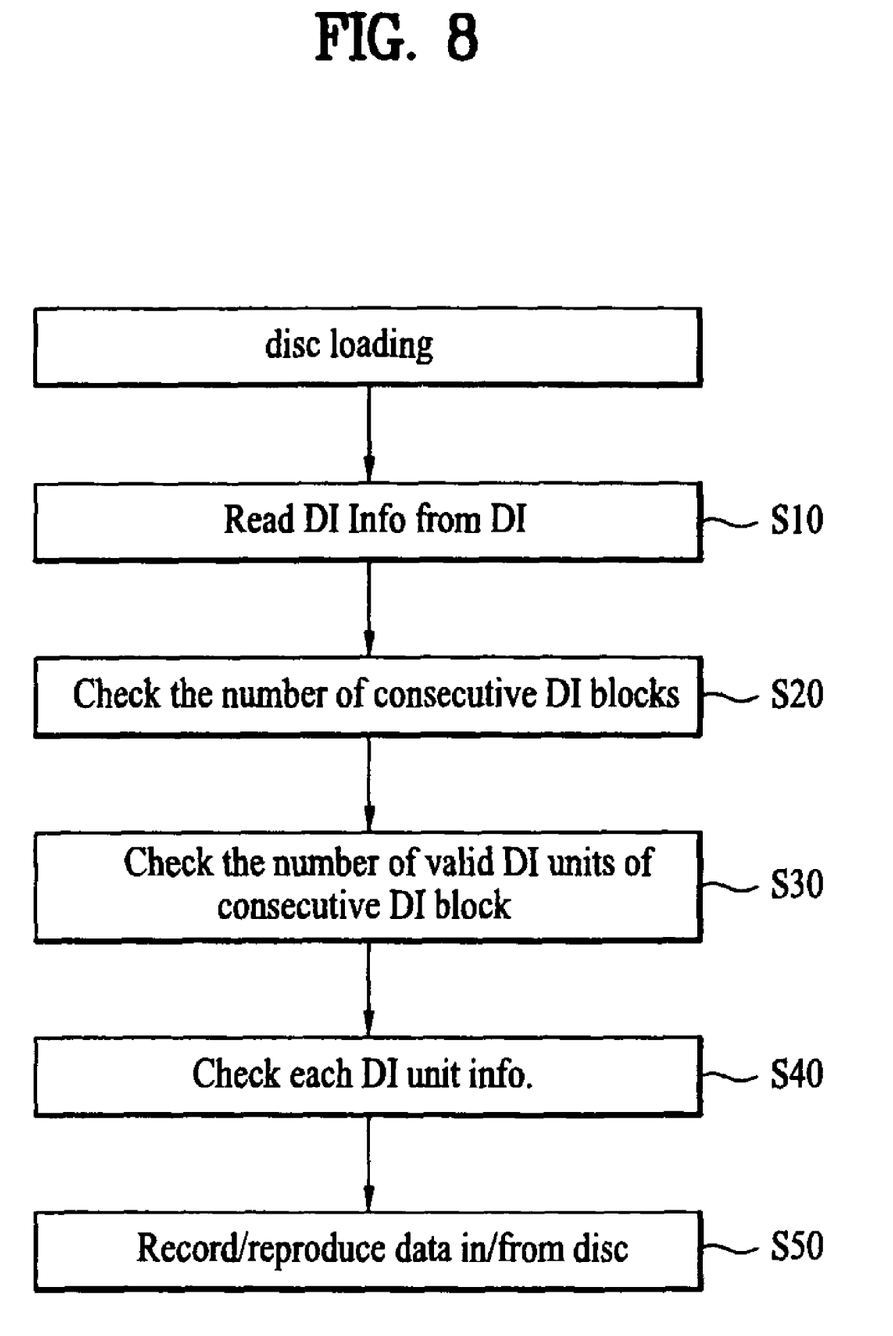
FIG. 8 is a flow chart illustrating a method for controlling a recording medium according to the present invention.

FIG. 8 is a flow chart illustrating a method for controlling a recording medium according to the present invention.

Referring to FIG. 8, the recording/reproducing unit 20 records/reproduces data on/from the optical disc, reads the above-mentioned control information from several DI units including the optical-disc control information, and employs the read control information for the recording/reproducing operations at step S10.

Specifically, the recording/reproducing unit 20 checks the number of consecutive DI blocks contained in a corresponding disc from a specific byte (e.g., a-, b-, or c-th byte) of the DI unit at step S20.

The recording/reproducing unit 20 checks the number of valid DI units contained in the above-mentioned consecutive DI block, and information indicating the sequence number of the valid DI units at step S30.

The recording/reproducing unit 20 reads control information from the DI unit equipped with the above-mentioned sequence number, and allows the controller 12 or the microprocessor 16 to employ the read control information.

If the controller 12 receives the read control information, it transmits a command for recording/reproducing data in a disc specific area to the recording/reproducing unit 20 using the control information contained in the DI unit, such that the recording/reproducing unit 20 records or reproduces data in/from the disc specific area at step S40.

As apparent from the above description, a recording medium, and a method and apparatus for controlling the recording medium according to the present invention can effectively provide the standardized recording/reproducing control information, and can properly cope with recording/reproducing operations of a variety of discs based on the extended standards.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium comprising:
   a management area in which control information is recorded, wherein
   the management area includes a plurality of first control information units equipped with the control information and a plurality of second control information units, the second control information unit being formed by grouping at least one first control information unit among the plurality of first control information units, and
   the control information includes information indicating the number of consecutive second control information units among the plurality of second control information units, and the control information further includes information indicating a sequence number of the first control information units contained in the consecutive second control information units.

2. The recording medium according to claim 1, wherein the control information further includes information indicating the number of the first control information units contained in the consecutive second control information units.

3. The recording medium according to claim 1, wherein the recording medium includes at least one recording layer and the management area, the management area being provided for each recording layer if the recording medium includes at least two recording layers.

4. The recording medium according to claim 3, wherein the recording medium includes a maximum of 8 recording layers.

5. The recording medium according to claim 1, wherein the recording medium is a Blu-ray Disc (BD).

6. The recording medium according to claim 5, wherein the first control information unit is a Disc Information (DI) unit.

7. The recording medium according to claim 5, wherein the second control information unit is a Disc Information (DI) block.

8. A method for controlling a recording medium, comprising the steps of:
   a) reading control information in a plurality of first control information units, the control information including information which is indicative of the number of consecutive second control information units among a plurality of second control information units, the control information including information indicating a sequence number of the first control information units contained in the consecutive second control information unit, the second control information unit being formed by grouping at least one first control information unit among the plurality of first control information units, and
   b) controlling the recording medium using the control information recorded in at least one first control information unit contained in the consecutive second control information units.

9. The method according to claim 8, wherein the control information includes information indicating the number of the first control information units contained in the consecutive second control information units.

10. An apparatus for controlling a recording medium comprising:
    a recording/reproducing unit configured to read or record data from or on the recording medium; and
    a controller, operatively coupled to the recording/reproducing unit, configured to identify control information in a plurality of first control information units, the control information including information which is indicative of the number of consecutive second control information units among a plurality of second control information units, the control information including information indicating a sequence number of the first control information units contained in the consecutive second control information unit, the second control information unit being formed by grouping at least one first control information unit among the plurality of first control information units, and
    the controller is configured to control the recording/reproducing unit to read or record the data by using the control information recorded in at least one first control information unit contained in the consecutive second control information units.

11. The apparatus according to claim 10, wherein the control information further includes information indicating the number of the first control information units contained in the consecutive second control information units by referring to the control information.

12. The apparatus according to claim 10, further comprising:
    a memory configured to store the control information in the first control information unit in the consecutive second control information units,
    wherein the controller is configured to identify the control information stored in the memory.

13. An apparatus for controlling a recording medium comprising:
    a pickup configured to record or reproduce data on/from the recording medium; and
    a controller, operatively coupled to the pickup, configured to control the pickup to read control information in a plurality of first control information units from the recording medium, and to identify the control information including information, which is indicative of the number of consecutive second control information units among a plurality of second control information units, the control information including information indicating a sequence number of the first control information units contained in the consecutive second control information unit, the second control information unit being formed by grouping at least one first control information unit among the plurality of first control information units.

14. The apparatus of claim 13, further comprising:
a memory configured to store the control information in the first control information unit in the consecutive second control information units,
wherein the controller is configured to control the memory to store the control information, and to identify the control information from the memory or the recording medium by the pickup.

* * * * *